United States Patent
Sanders et al.

(10) Patent No.: US 6,342,156 B1
(45) Date of Patent: Jan. 29, 2002

(54) MULTI-SEGMENT CONTINUOUS FILTRATION SYSTEM

(75) Inventors: Danny Sanders, Crittenden; Mark McCord; Richard Andrew, both of Warsaw; Kenneth Boldery, Milton; David Mullins, Florence; Robert Coyle, Verona, all of KY (US)

(73) Assignee: Continental Pet Technologies, Inc., Florence, KY (US)

( * ) Notice: Subject to any disclaimer, the term of this patent is extended or adjusted under 35 U.S.C. 154(b) by 0 days.

(21) Appl. No.: 09/398,476

(22) Filed: Sep. 17, 1999

(51) Int. Cl.⁷ ............................ B01D 25/12; B01D 25/19
(52) U.S. Cl. ...................... 210/224; 210/232; 210/488; 210/498; 210/499; 425/197; 425/198; 425/199
(58) Field of Search ........................ 210/224, 227–229, 210/767–769, 347–348, 499, 232, 447, 445, 236, 489, 498, 488, 230, 231, 346, 486; 425/197–199, 185–186

(56) References Cited

U.S. PATENT DOCUMENTS

| | | | |
|---|---|---|---|
| 1,195,576 A | * | 8/1916 | Garrahan |
| 2,513,795 A | * | 7/1950 | Gliss |
| 3,028,627 A | * | 4/1962 | McCormick |
| 3,856,680 A | * | 12/1974 | Elmore ........................ 210/184 |
| 4,059,525 A | * | 11/1977 | Krasnow ..................... 210/236 |
| 4,072,457 A | * | 2/1978 | Cooksey et al. |
| 4,237,014 A | * | 12/1980 | Trott ........................... 210/330 |
| 4,358,375 A | * | 11/1982 | Wood .......................... 210/266 |
| 4,728,279 A | * | 3/1988 | Bellmer |

FOREIGN PATENT DOCUMENTS

CA          2205450 A   * 11/1998

* cited by examiner

Primary Examiner—Matthew O. Savage
Assistant Examiner—Marianne Ocampo
(74) Attorney, Agent, or Firm—Finnegan, Henderson, Farabow, Garrett & Dunner

(57) ABSTRACT

A multi-segment filter system is provided for continuous filtration of high viscosity materials, such as polymer melts. In particular, each segment comprises a filter screen positioned between a bottom breaker plate and a top cover plate. The filter screen has a fixed alignment in relation to the breaker plate and cover plate, to prevent the formation of undesirable gaps. In one example, the alignment is fixed through positioning of pins extending from the breaker plate and passing through apertures in the filter screen and cover plate. Two pins are preferably positioned on the breaker plate in a nonsymmetric manner to ensure that a multilayered filter screen is positioned adjacent the breaker plate in a desired orientation. Successive segments are positioned on end and preferably include overlapped filter screen portions, thus eliminating any gaps between each segment. Overlapping coupling connections may also be provided in adjacent breaker plates.

19 Claims, 6 Drawing Sheets

MULTI-SEGMENT CONTINUOUS FILTRATION SYSTEM

FIELD OF THE INVENTION

The present invention relates to a multi-segment filter system for continuous filtration of high viscosity materials, such as polymer melts. Each segment includes a filter screen disposed adjacent a breaker plate and cover plate to secure the filter screen in a fixed alignment. The system allows for continuous filtration while minimizing the occurrence of unwanted gaps that retard or disrupt the filtration process.

BACKGROUND OF THE INVENTION

One common method for the manufacture of plastic articles includes heating a polymeric material to an appropriate temperature to form a polymer melt which can then be injected into a mold and cooled such that the plastic article adopts the shape of the mold (i.e. injection-molding).

To obtain a high quality molded article, it is common to purify the polymer melt via filtering, prior to injection-molding. For example, if an unwanted particle is introduced into the injection mold, a pinhole may form in the article. Then if the molded article is subsequently blow-molded, the pinhole may cause the blow-molded article to fracture or explode. A purification/filtration step can be combined with melt extrusion, whereby an extruder forces the polymer melt through a filter under high pressure and the resulting filtered polymer is then introduced into the mold.

Filtration can pose several difficulties, often due to hardening of the polymer melt (i.e. increased viscosity upon cooling). Polymeric residues may stick to a filter and harden over time, resulting in a blocked filtration pathway. Filtered impurities can also block the filter and retard the filtration process. When a blockage occurs, higher pressure is required to extrude the polymeric material through the blocked filter. This higher pressure may disrupt the extrusion process and/or strain the machinery. In contrast, a predictable and constant pressure drop across the filter over time allows for a smooth and relatively uninterrupted extrusion.

The above difficulties are somewhat alleviated by the use of a continuous filtration system. A "continuous filtration system" provides either a roll of filtering material i.e., a very long filter screen, or a plurality of individual filter screens (segments) positioned in a line (i.e., adjacent one another on end). The filter screen segments or roll move transversely across the exit end of the extruder, in a direction perpendicular to the extruded melt flow. The movement of the screens or roll can occur either at a constant steady rate, or intermittently. In this manner, polymer melt is constantly exposed to a clean portion of a filter screen roll, or a new filter screen. Accordingly, this system decreases the likelihood of exposing the melt to a blocked filter. As a result, consistent pressures (constant pressure drop) can be applied to force melt through the filter, providing for ease of operation and reducing the number of delays and amount of shutdown time.

Problems with known multi-segment continuous filtration systems remain however, particularly in preventing the formation of gaps between the filters that allow small amounts of polymer melt to be injection-molded as unfiltered material. For example, the high pressures applied to polymer melts during filtration may cause a filter screen segment to shift from its desired position. Intermittent extrusions, which involve abrupt stops and starts, can cause additional problems. For example, in an intermittent extrusion process a high pressure polymer melt stream is followed by a complete removal of pressure when the extruder is pulled back (in a direction opposite to the filter). As the extruder is pulled away, the polymeric material contacting the filter screen may cause the screen segment to lift and shift its position, resulting in the formation of a large, unwanted gap. In a subsequent extrusion step, unfiltered material may then pass through this gap.

Other prior art systems utilize a rotatable filtration device, namely a plurality of screens positioned in a circular pattern. Such devices are not easily cleaned, because the cleaning step involves back-filtering pure polymer melt through the filter to release impurities.

Thus, there remains a need for improved continuous filtration devices.

SUMMARY OF THE INVENTION

One aspect of the present invention is a system for continuous filtration comprising multiple segments. Each segment comprises a filter screen, a breaker plate positioned adjacent one face of the filter screen, and a cover plate positioned adjacent an opposing face of the filter screen. The screen is held in fixed alignment with respect to the breaker and cover plates.

In another aspect of the invention, a leading breaker plate has a portion of a first filter screen disposed thereon, and an end portion which provides an overhang. A trailing breaker plate has a second filter screen disposed thereon. The leading and trailing breaker plates are positioned adjacent on end, such that the overhang of the first screen overlaps with an end portion of the second screen.

Other features of the invention will be apparent from the following detailed description when considered in conjunction with the accompanying drawings. In the figures, each identical or nearly identical component illustrated in various figures is represented by a single numeral. For purposes of clarity, not every component is labeled in every figure, nor is every component of each embodiment shown where illustration is not necessary to allow those of ordinary skill in the art to understand the invention.

DETAILED DESCRIPTION

One aspect of the present invention is to provide a continuous filter system. A "continuous filter system" provides a clean, unclogged filter media without having to interrupt the filtration process. A clean filter can be provided at a continual steady rate, or intermittently. This is achieved by positioning a plurality of filter segments adjacent each other and allowing the filters to travel past the exit end of an extruder, preferably in a direction generally perpendicular to the direction of the extrusion melt flow.

Figure 1:
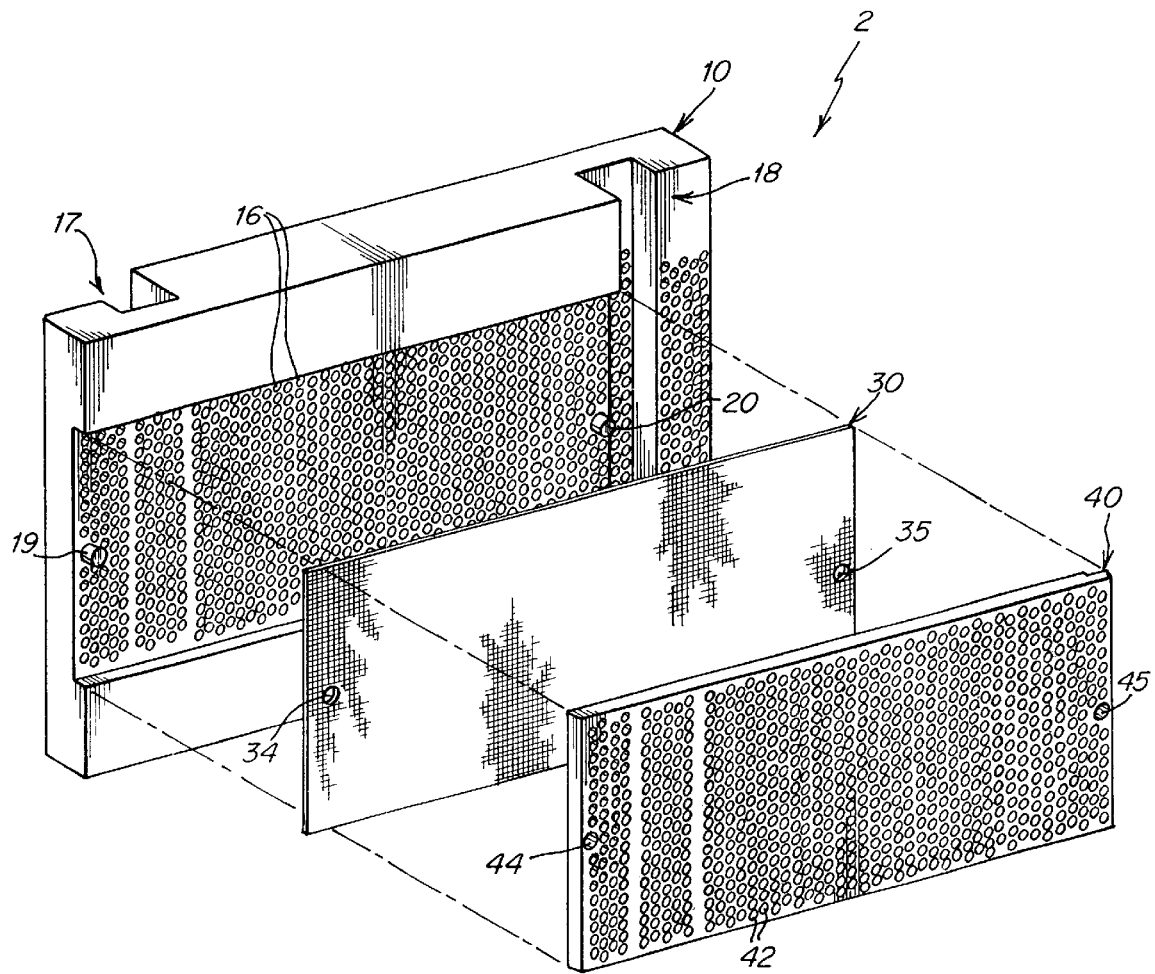
FIG. 1 is an exploded perspective view of a filter segment according to the present invention, including a filter screen disposed between a breaker plate and a cover plate.
Figure 8:
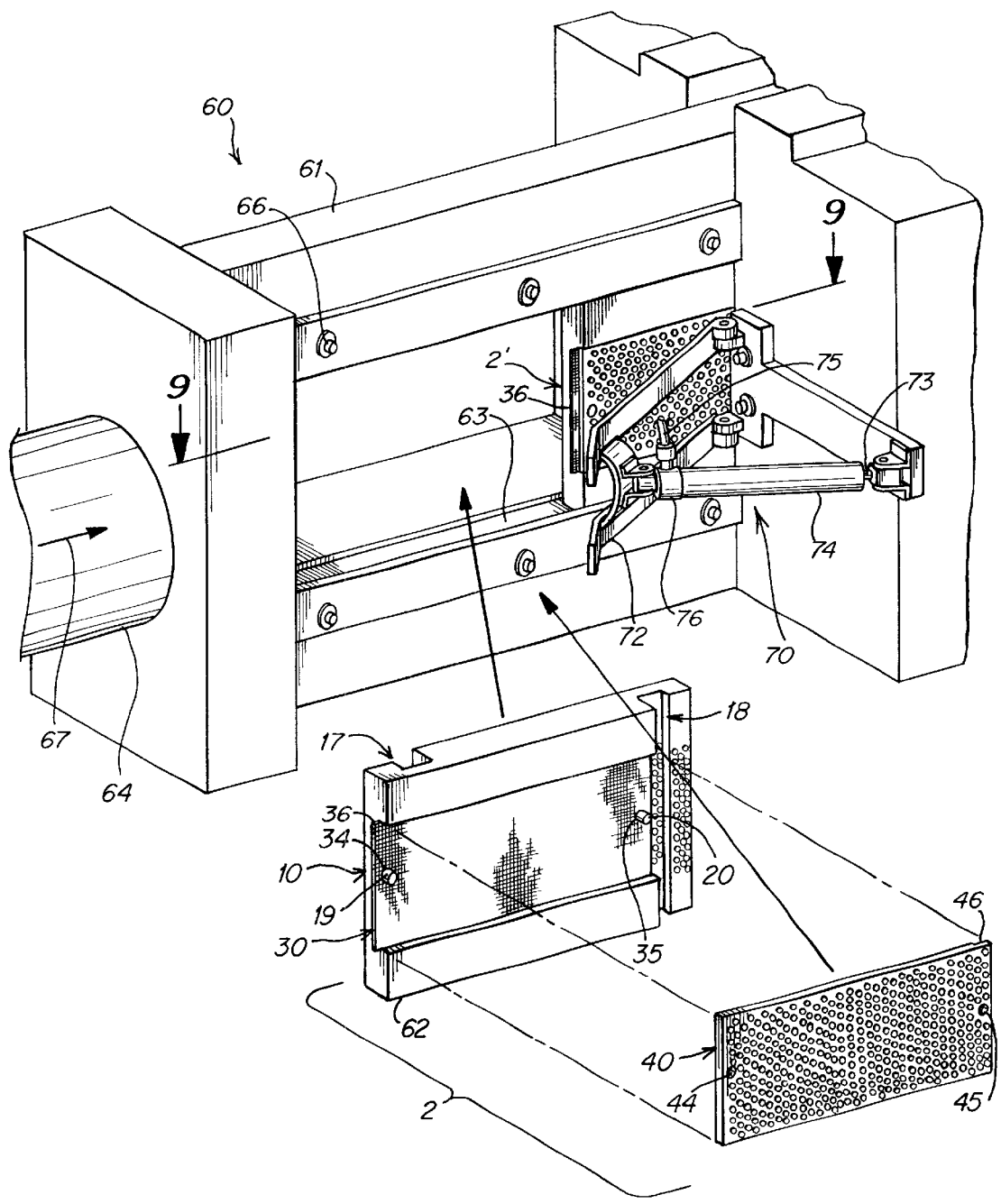
FIG. 8 is a partially broken away, exploded perspective view of a clamp for securing the cover plate, the screen and the breaker plate of one segment in a fixed position on an extruder.

The system comprises multiple segments, each segment being identical. A segment comprises a filter screen with opposing faces positioned between a breaker plate and a cover plate. This arrangement allows the filter screen to be protected on both opposing faces. Referring to an embodiment shown in FIG. 1, each segment 2 (of a multi-segment system) comprises a breaker plate 10 positioned adjacent a back face of an individual filter screen 30. Cover plate 40 is positioned adjacent an opposing front face of filter screen 30. Unfiltered polymer melt first passes (transversely) through cover plate 40, is filtered while passing through screen 30, and then passes through breaker plate 10 as filtered material. Referring to FIG. 8, one end of an assembled segment 2 is placed in a recess (or track) 63 adjacent one end of another segment 2'. A plurality of segments can then be moved past an extruder (not shown) along recess 63 in the direction of arrow 67.

Breaker plate 10 protects filter screen 30 from substantial degradation, and also supports screen 10 when a high pressure polymer melt stream passes through the filter. In addition, breaker plate 10 is a component of a mechanism that conveys each segment along a track to and from the extruder (see FIG. 8).

Figure 2:
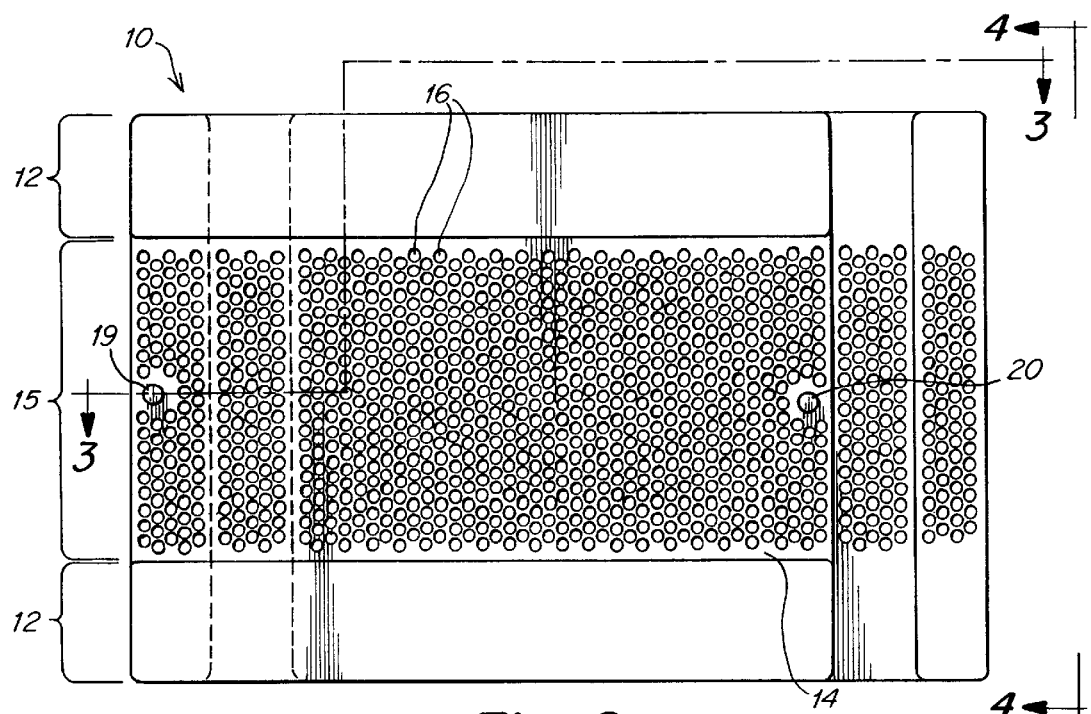
FIG. 2 is a front elevational view of the breaker plate of FIG. 1, the breaker plate having elongated top and bottom solid portions and a middle portion with a plurality of holes.

FIG. 2 shows a more detailed front elevational view of breaker plate 10. Breaker plate 10 has top and bottom solid edge portions 12 disposed along a length direction, and a middle portion 15 arranged lengthwise between solid portions 12. Middle portion 15 has an array of holes 16 that extend through a thickness of the breaker plate (see FIG. 3). Filtered material will pass through holes 16 and then either be collected for future use or introduced directly into a mold. Breaker plate 10 is typically made of metal, although other materials capable of withstanding the high operating pressures and melt temperatures can be used, such as composites and durable plastics. A suitable breaker plate 10 can be purchased from The Berlyn Corporation, Worcester, Mass., 01605.

Figure 3:
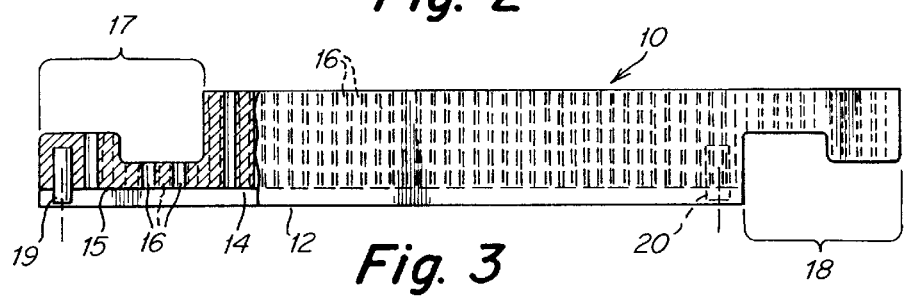
FIG. 3 is a top plan view, partially in section, taken along line 3—3 of FIG. 2, showing the plurality of holes extending through the middle portion of the breaker plate.

FIG. 3 shows a top plan view of breaker plate 10, partially in cross-section, taken along line 3—3 of FIG. 2. Breaker plate 10 has coupling connections 17 and 18 at each end, extending widthwise from top to bottom, for connecting each breaker plate to a leading and trailing breaker plate respectively in adjacent on end relation. For example, coupling connection 18 of breaker plate 10 will fit under coupling connection 17 of an adjacent breaker plate, and coupling connection 17 of breaker plate 10 will fit over coupling connection 18 of an adjacent breaker plate (refer to FIG. 10).

Figure 4:
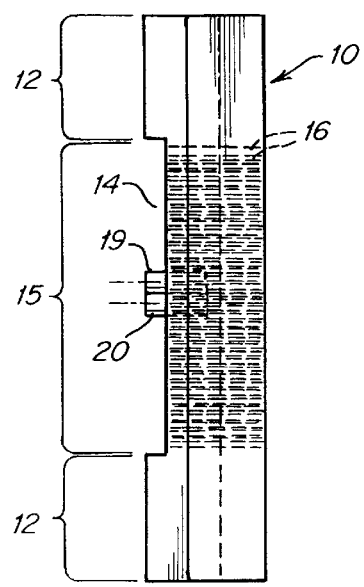
FIG. 4 is an end view of the breaker plate of FIG. 2, taken along line 4—4 of FIG. 2.

FIG. 4 is a side end view of breaker plate 10, as seen along line 4—4 of FIG. 2. This view illustrates the top and bottom solid edge portions 12 and a recessed central portion 14, in middle portion 15, for receiving a filter screen (screen 30 in FIG. 1). In this embodiment, the depth of recessed portion 14 approximates a thickness of the filter screen. In another embodiment, the depth of recessed portion 14 can be greater or less than a thickness of the filter screen, so long as the cover plate is designed accordingly with appropriate contours to fit snugly adjacent the filter screen. The screen 30 extends lengthwise from coupling connection 18 (without covering 18) to the opposite end of the plate 10 (see FIG. 3).

Figure 5:
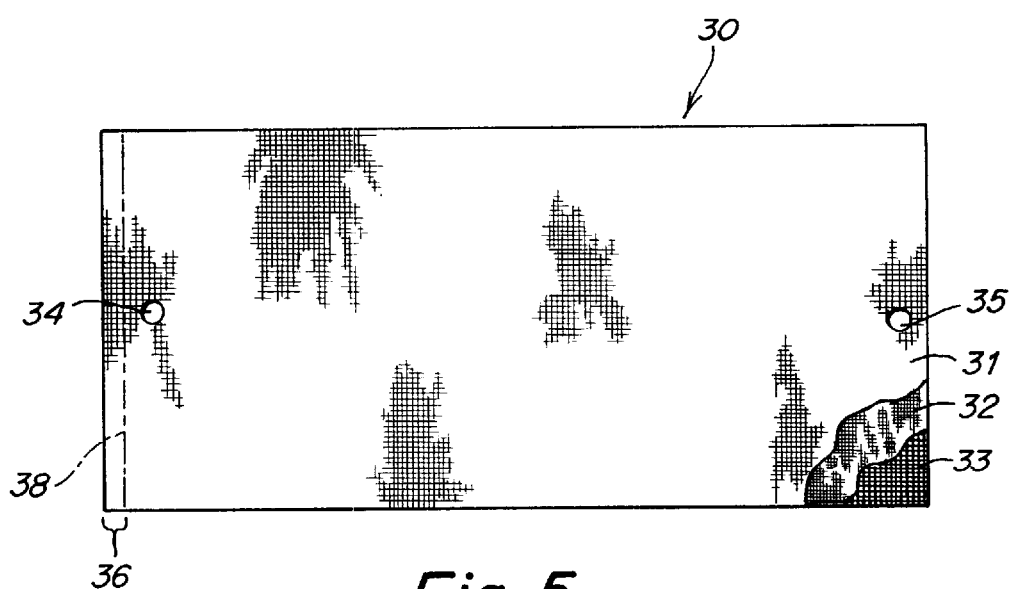
FIG. 5 is a front elevational view of the filter screen of FIG. 1, having multiple layers.

FIG. 5 shows a front elevational view of filter screen 30. In this embodiment filter screen 30 comprises three layers. Front layer 31 (the layer first contacted by the polymer melt) comprises an intermediate weave material to filter out large particles. Middle layer 32 comprises a fine weave material to filter out smaller impurities. Bottom layer 33 comprises a coarse mesh which contacts the breaker plate. The coarse mesh allows layer 33 to withstand frictional stresses against breaker plate 10 during high pressure extrusion of the polymer melt. A multiple layer filter screen can be purchased from U.S. Filter/Johnson/Niagra Screens, Houston, Tex., 77041. In other embodiments, filter screen 30 can comprise a single layer or two layers or more with varying mesh types, depending on the material to be filtered, polymer melt pressures, operational temperature, or economic considerations.

A widthwise dashed line 38 in FIG. 5 corresponds to the position of a left side edge of breaker plate 10 when filter screen 30 is disposed on breaker plate 10. That portion of screen 30 to the left of dashed line 38 overhangs the breaker plate to form overhang portion 36.

Figure 6:
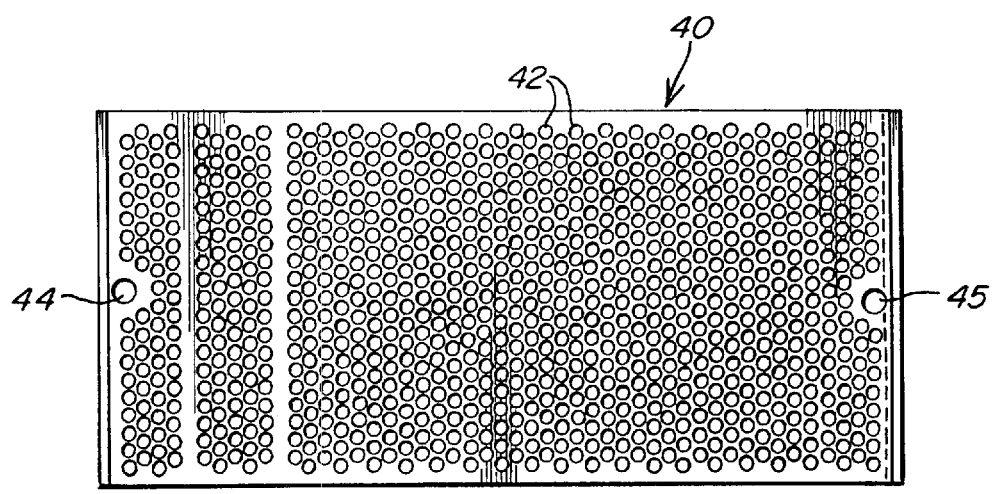
FIG. 6 is a front elevational view of the cover plate of FIG. 1, having a plurality of holes.

FIG. 6 is a front elevational view of the cover plate 40. The back of cover plate 40 is positioned adjacent the front face of filter screen 30 (the face opposite the breaker plate—see FIG. 1). Cover plate 40 has a plurality of holes 42 extending through its entire thickness, allowing material to pass through to filter screen 30.

Figure 7:
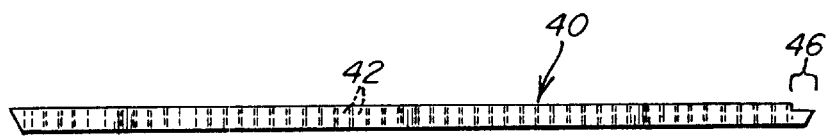
FIG. 7 is a top plan view of the cover plate of FIG. 6.

FIG. 7 shows a corresponding top plan view of cover plate 40. A recessed end area 46 is provided to receive overhang portion 36 of the adjacent filter screen (refer to FIG. 10 and accompanying discussion).

An advantageous feature of the present invention lies in the ability to fix the alignment of the filter screen 30 with respect to the breaker plate 10 and the cover plate 40. A fixed alignment allows the filter screen to withstand movement when subjected to high pressure polymer flows. During the filtration process, a segment can be subjected to melt pressures of at least 1,000 psi, 2,500 psi, 5,000 psi, or even as high as 10,000 psi. At these pressures, a desired alignment of each segment may shift in either a horizontal direction (in the plane of the each segment) or a vertical direction (in a direction perpendicular to the plane of each segment). This shifting can produce unwanted gaps that reduce the effectiveness of the filtration. A fixed alignment refers to a fixed horizontal and vertical alignment.

Fixed alignment is achieved by providing an aligning mechanism engaging each of the breaker, filter and cover plates, such as one or more pins extending from or through each of the three elements (breaker, filter and cover plates). For example, a dowel pin can be integral with or attached to the breaker plate, and extend snugly through holes in the screen and cover plate. Preferably the dowel pin is integral with the breaker plate. In a preferred embodiment, the breaker plate has at least two dowel pins.

Referring back to FIG. 2, breaker plate 10 in this embodiment has two spaced dowel pins 19 and 20 extending from the front face of the plate. Pin 19 is positioned on the left end, directly opposite coupling connection 17, and pin 20 is positioned on the right end of middle portion 15, adjacent coupling connection 18. Also referring to FIGS. 5 and 6, both filter screen 30 and cover plate 40 have bore holes (apertures) to receive the dowel pins 19 and 20 of breaker plate 10 (filter screen 30 has bore holes 34 and 35 and cover plate 40 has bore holes 44 and 45). One of ordinary skill in the art can determine the size of the dowel pins and diameter of the bores to provide fixed alignment of the entire assembly. By this design, filter screen 30 is prevented from substantially shifting in relation to the breaker plate and the cover screen. In embodiments where more than two dowel pins are used, an appropriate matching number of apertures are provided in the filter screen and cover plate to engage the dowel pins.

In this embodiment, the two dowel pins 19, 20 of breaker plate 10 are positioned nonsymmetrically on the breaker plate. "Positioned nonsymmetrically" (or nonsymmetric positioning) refers to a lack of mirror symmetry within the breaker plate. Nonsymmetric positioning of dowel pins 19 and 20 can be shown in FIG. 2 by drawing a straight line through the middle of breaker plate 10, either lengthwise or widthwise, which results in one side that does not form a mirror image of the other side (a mirror image of dowel pin 19 does not overlap the position of pin 20). This nonsymmetric positioning allows the filter screen to be positioned on the breaker plate in a unique orientation. This feature is especially advantageous for filter screens having multiple layers. For example, it may be important to position a multiple-layer filter screen having a coarse outer layer and a finer mesh layer in such a manner that only the coarse layer contacts the breaker plate. The nonsymmetric positioning of the dowel pins ensures that during assembly the coarse bottom layer is always positioned adjacent the breaker plate, i.e., it is impossible to position the filter screen bore holes over the dowel pins such that the finer mesh layer portion contacts the breaker plate. Any accidental positioning of the finer mesh layer against the breaker plate is not allowed, thus preventing the finer mesh layer from being subjected to excessive wear and tear.

The nonsymmetric positioning of the aligning mechanism (e.g., dowel pins) also ensures proper alignment of the breaker plate and cover plate, where one side edge of the cover plate has a recess 46 to accept the overlapped filter screen portion 51 (see further discussion below and FIG. 10). This insures correct placement of the leading edge which is relieved (recessed) to accept a double thickness of filter screen.

In some embodiments, the dowel pins are sufficient to prevent unwanted gaps. In another embodiment, the system further comprises a fastener to secure the cover plate onto the screen and the screen onto the breaker plate. Examples of fasteners include screws, bolts, nails, clamps or the like. The fastener can operate in conjunction with the dowel pin(s) to fix the alignment of the segment components. This extra fastener is particularly useful when the filter assembly is subjected to an intermittent extrusion process. In an intermittent extrusion, the polymer melt is extruded through the filter at high pressures. After extrusion, the extruder is pulled back in a direction opposite the filter. Depending on the applied pressure, the polymer type and/or the speed of pull back, polymeric material contacting the cover plate may lift the cover plate and/or filter screen from the breaker plate, thus creating an unwanted gap despite the presence of the dowel pins. Upon applying a subsequent extrusion, the filter screen, the breaker plate and cover plate may not maintain their original alignment, and unfiltered polymer melt can pass through the gap.

In one embodiment, the fastener is a clamp for securing the position of the cover plate and the filter screen against the breaker plate. Referring to a preferred embodiment of FIGS. 8 and 9, the fastener is clamp 70 which contacts the top of the cover plate only. The clamp is in the form of a "ski" that can be easily disengaged to allow facile addition or removal of the breaker plate/screen/cover plate assembly to and from the filter device. In another embodiment, the clamp contacts both the top of the cover plate and bottom of the breaker plate.

Figure 9:
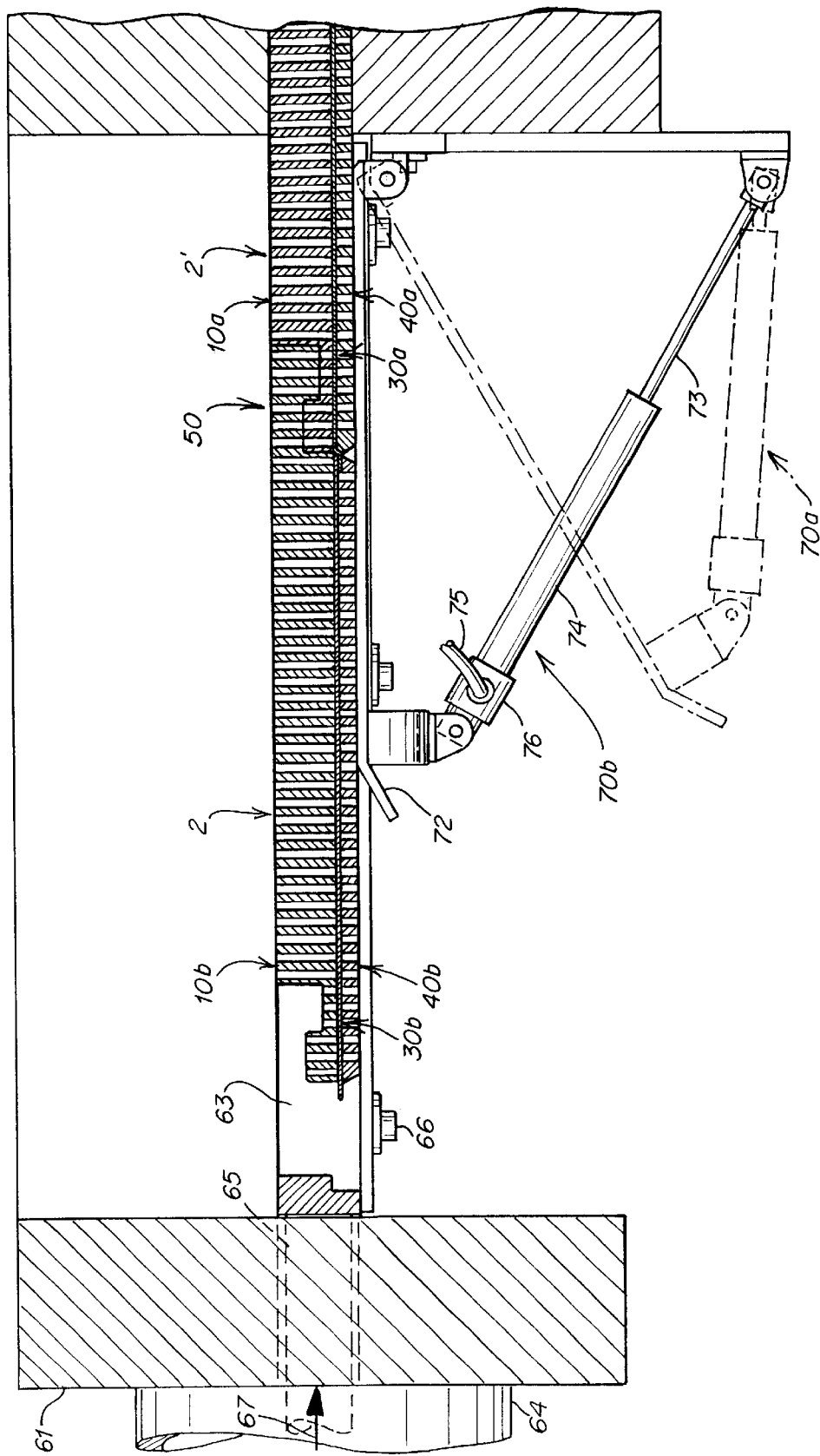
FIG. 9 is a cross-sectional view taken along line 9—9 of FIG. 8 of a leading breaker plate (of one segment) positioned adjacent on end against a trailing breaker plate (of another segment), each breaker plate having a filter screen disposed thereon and an overlap portion of the filter screens.

Referring to FIGS. 8 and 9, clamp 70 has an extendable arm that allows "ski" portion 72 to clamp onto the filter segments. In this preferred embodiment, FIG. 8 shows clamp 70 as comprising piston rod 73 and cylinder 74. The rod can be operated by a spring-loaded mechanism, a hydraulic mechanism or a pneumatic mechanism. Clamp 70 further comprises a fluid or gas supply line 75 and high pressure closure 76.

FIG. 8, shows a portion 60 of a filtration system having a housing 61 into which a plurality of individual filter segments 2, 2', etc. are loaded. Segment 2 as shown comprises breaker plate 10, filter screen 30 and cover plate 40. Screen 30 is disposed on middle portion 15 of breaker plate 10, and bore holes 34 and 35 of screen 30 fit over dowel pins 19 and 20 of plate 10, respectively. Cover plate 40 in turn is disposed on screen 30, and bore holes 44 and 45 fit over dowel pins 19 and 20.

FIG. 9 is a side view of housing 61. Bolt 66 is a reference point for comparing FIGS. 8 and 9. In FIG. 9, clamp 70 is shown in an "open" position in phantom lines 70a, and in a "closed" position in solid lines 70b.

At the start of filtration, bottom edge 62 of segment 2 is situated in recess 63, as shown in FIG. 8. One end edge of segment 2 is positioned adjacent one end edge of segment 2' (i.e., positioned adjacent on end, where segment 2' is the leading segment and segment 2 is the trailing segment). In the closed position, "ski" portion 72 contacts both a leading segment 2' and a trailing segment 2 (FIG. 9). A conveyer (e.g. a cylinder 64 and piston rod 65—see FIG. 9) then pushes segments 2 and 2' along recess 63 in the direction of arrow 67.

Figure 10:
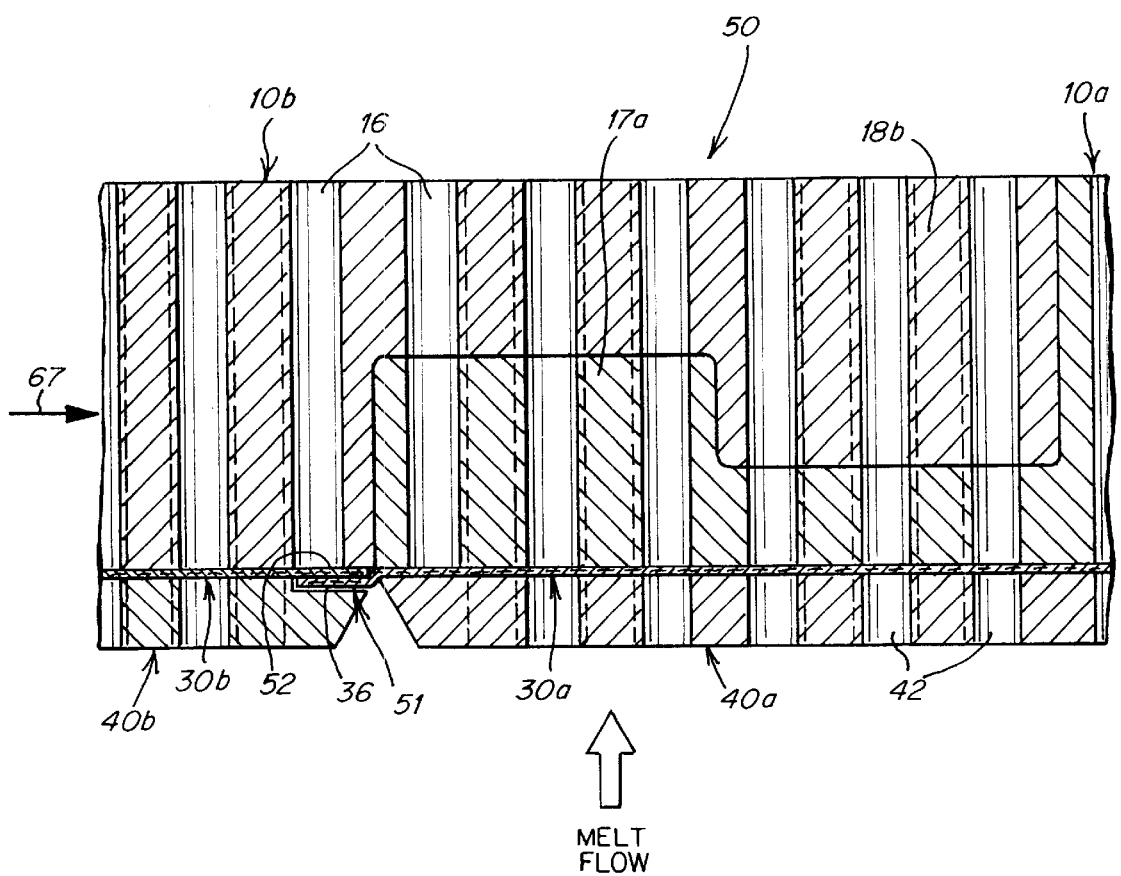
FIG. 10 is an enlarged fragmentary cross sectional view of the coupling connections between segments as shown in FIG. 9.

Another aspect of the present invention is to provide a system for continuous filtration comprising multiple segments, where the system can be delineated into a series of leading and trailing breaker plates, as exemplified in FIGS. 9 and 10. FIG. 10 shows an enlarged fragmentary cross sectional detail view of an overlap portion 50 comprising one leading breaker plate/trailing breaker plate set in the series. Leading breaker plate 10a (on the right) is positioned adjacent, on end, against trailing breaker plate 10b (on the left). Leading plate 10a has screen 30a disposed thereon, whereas trailing breaker plate 10b has filter screen 30b disposed thereon. Cover plates 40a and 40b are disposed on respective filter screens 30a and 30b. Coupling connection 17a of breaker plate 10a overlaps with a corresponding coupling connection 18b of breaker plate 10b, to further secure the positioning of breaker plate 10a with respect to breaker plate 10b.

An advantageous feature is the prevention of unwanted gaps between adjacent filter screens. Upon positioning leading plate 10a adjacent on end with trailing plate 10b, screen 30a has an overhang portion 36 (also shown previously in FIG. 5) which overlaps a portion 52 of filter screen 30 to create an overlap portion 51. Without this overlap portion 51

(i.e. if screen 30a was merely positioned adjacent on end against screen 30b), an unwanted gap can be formed in the interface between screens 30a and 30b and breaker plates 10a and 10b. Preferably as shown, the overlapped filter screen portion 51 is offset from the overlapped coupling connections of 17a and 18b.

For filtration processes requiring lower melt pressures, it is not always necessary to have overlapping coupling mechanisms 17a and 18b in order to prevent the formation of an unwanted gap. The breaker plates may have straight side ends (no coupling mechanisms 17a and 18b), but may still have the overlap filter portion 51.

The additional height provided by the overlap portion 51 may result in a non-uniformity in screen thickness throughout the entire filtration system (the entire plurality of screens). To prevent this, cover plate 40 is provided with a recessed area 46 (see FIG. 7) designed to accommodate the overlap portion 51 of FIG. 10. This recessed area allows the cover plate to fit snugly over the entire length of the filter screen.

Those skilled in the art will appreciate that all parameters listed herein are meant to be exemplary and that actual parameters will depend upon the specific application for which the methods and apparatus of the present invention are used. It is therefore understood that the foregoing embodiments are presented by way of example only and that, within the scope of the appended claims and equivalents thereto, the invention may be practiced otherwise than as specifically described. For example, the breaker plate, screen and cover plate may have larger or smaller dimensions, different contours, and different materials than shown in FIGS. 1–10. One of ordinary skill in the art would readily understand that the positioning of the pins, bore holes, relief and recess areas and overhang can vary to allow operation of the filtration system within the scope of the present invention.

What is claimed is:

1. A system having multiple segments for continuous filtration, each segment comprising:
   a filter screen;
   a breaker plate positioned adjacent one face of the filter screen;
   a cover plate positioned adjacent an opposing face of the filter screen; and
   an aligning mechanism comprising at least two means for engaging and positioning the filter screen in fixed alignment with respect to the breaker and cover plates, each aligning mechanism means being positioned non-symmetrically with respect. to the other and extending through one or more of the filter screen, breaker plate, and cover plate.

2. The system of claim 1, including a fastener to further secure in the fixed alignment the cover plate, the filter screen and the breaker plate.

3. The system of claim 2, wherein the fastener comprises a clamp.

4. The system of claim 3, wherein the clamp is positioned on the cover plate.

5. The system of claim 1, wherein each of the aligning mechanism means comprises a pin.

6. The system of claim 5, wherein the filter screen and the cover plate each have at least one aperture engaging the pin.

7. The system of claim 1, wherein each of the aligning mechanism means is integral with the breaker plate.

8. The system of claim 1, wherein each segment is capable of withstanding a pressure of at least about 1500 psi.

9. A system for continuous filtration comprising:
   a leading breaker plate having a portion of a first filter screen disposed thereon, the first filter screen having an end portion which provides an overhang; and
   a trailing breaker plate having a second filter screen disposed thereon, the leading and trailing breaker plates being positioned adjacent on end wherein the overhang of the first filter screen overlaps with an end portion of the second filter screen to provide an overlapped filter screen portion.

10. The system of claim 9, wherein a coupling connection is provided on each breaker plate.

11. The system of claim 15, wherein the coupling connection is an overlapping portion of the leading and trailing breaker plates.

12. The system of claim 11, wherein the overlapping portion is offset from the overlapped filter screen portion.

13. The system of claim 12, wherein a cover plate is positioned adjacent a face of its respective filter screen opposite the breaker plate, and an aligning mechanism engaging each of the breaker plate, the filter screen and the cover plate to hold them in fixed alignment.

14. The system of claim 13, wherein a fastener further secures the breaker plate, the filter screen and the cover plate in fixed alignment.

15. The system of claim 1, wherein the overhang is offset from a plane of the first and second filter screens.

16. The system of claim 15, wherein a cover plate, positioned adjacent a face of the second filter screen opposite the trailing breaker plate, has a recessed end fitted to accommodate the overlapped filter screen portion.

17. The system of claim 15, wherein at least one pin positions each breaker plate and its respective filter screen in fixed alignment.

18. The system of claim 15, wherein the system is capable of withstanding a pressure of at least about 1500 psi.

19. The system of claim 9, wherein a cover plate is positioned adjacent a face of its respective filter screen opposite the breaker plate.

* * * * *

UNITED STATES PATENT AND TRADEMARK OFFICE
CERTIFICATE OF CORRECTION

PATENT NO. : 6,342,156 B1
DATED : January 29, 2002
INVENTOR(S) : Sanders et al.

It is certified that error appears in the above-identified patent and that said Letters Patent is hereby corrected as shown below:

Column 7,
Line 50, please delete "respect. to" and substitute therefore -- respect to --

Column 8,
Line 26, please delete "claim 15" and substitute therefore -- claim 10 --
Line 40, please delete "claim 1" and substitute therefore -- claim 9 --

Signed and Sealed this

Twentieth Day of August, 2002

Attest:

Attesting Officer

JAMES E. ROGAN
Director of the United States Patent and Trademark Office